US012118992B2

United States Patent
Huang et al.

(10) Patent No.: US 12,118,992 B2
(45) Date of Patent: Oct. 15, 2024

(54) VOICE INTERACTION METHOD AND APPARATUS, DEVICE AND COMPUTER STORAGE MEDIUM (71) Applicant: BEIJING BAIDU NETCOM SCIENCE AND TECHNOLOGY CO., LTD., Beijing (CN)

(72) Inventors: Jizhou Huang, Beijing (CN); Shiqiang Ding, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 371 days.

(21) Appl. No.: 17/622,402

(22) PCT Filed: Jun. 2, 2021

(86) PCT No.: PCT/CN2021/097972
§ 371 (c)(1),
(2) Date: Dec. 23, 2021

(87) PCT Pub. No.: WO2022/105188
PCT Pub. Date: May 27, 2022

(65) Prior Publication Data
US 2023/0290347 A1   Sep. 14, 2023

(30) Foreign Application Priority Data

Nov. 20, 2020   (CN) .......................... 202011307586.8

(51) Int. Cl.
*G10L 15/22* (2006.01)
*G06F 16/9032* (2019.01)
(Continued)

(52) U.S. Cl.
CPC ........ *G10L 15/22* (2013.01); *G06F 16/90332* (2019.01); *G10L 15/1815* (2013.01); *G10L 15/30* (2013.01); *G10L 2015/223* (2013.01)

(58) Field of Classification Search
USPC ...................................... 704/1–504
See application file for complete search history.

(56) References Cited

U.S. PATENT DOCUMENTS 8,731,942 B2 *  5/2014  Cheyer .................. G06F 40/30
                                                   704/270.1
9,740,769 B2    8/2017  Bhagwat et al.
(Continued)

FOREIGN PATENT DOCUMENTS

CN   108847229 A   11/2018
CN   111341309 A    6/2020
(Continued)

OTHER PUBLICATIONS

International Search Report of PCT/CN2021/097972, Sep. 14, 2021, 5 pages.
(Continued)

*Primary Examiner* — Marcus T Riley
(74) *Attorney, Agent, or Firm* — Brooks Kushman P.C.

(57) ABSTRACT

Technical solutions relate to the fields of artificial intelligence technologies and voice technologies. A technical solution includes: performing voice recognition and demand analysis on a voice instruction input by a user; in response to an unknown demand obtained by the demand analysis, acquiring information of a query entity and query content using a result of the demand analysis, and acquiring reply information corresponding to the query content by communication with the query entity; and returning a first voice response to the user using the reply information.

17 Claims, 6 Drawing Sheets

(51) Int. Cl.
*G10L 15/18* (2013.01)
*G10L 15/30* (2013.01)

(56) References Cited

U.S. PATENT DOCUMENTS

| | | | | |
|---|---|---|---|---|
| 10,599,644 | B2* | 3/2020 | Braz | G06F 16/24522 |
| 11,379,529 | B2* | 7/2022 | Fenton | G06N 20/00 |
| 11,580,481 | B2* | 2/2023 | Fukuda | G06Q 10/0637 |
| 11,650,812 | B2* | 5/2023 | Correia | G06F 8/71 |
| | | | | 717/122 |
| 11,775,891 | B2* | 10/2023 | Brown | G06F 16/9535 |
| | | | | 705/7.12 |
| 11,811,585 | B2* | 11/2023 | Han | G06Q 10/0639 |
| 2011/0252011 | A1* | 10/2011 | Morris | H04L 51/52 |
| | | | | 707/706 |
| 2012/0016678 | A1* | 1/2012 | Gruber | G06F 16/9537 |
| | | | | 704/E21.001 |
| 2012/0245944 | A1 | 9/2012 | Gruber et al. | |
| 2013/0110505 | A1 | 5/2013 | Gruber et al. | |
| 2013/0110515 | A1 | 5/2013 | Gruber et al. | |
| 2013/0110518 | A1 | 5/2013 | Gruber et al. | |
| 2013/0110519 | A1 | 5/2013 | Cheyer et al. | |
| 2013/0110520 | A1 | 5/2013 | Cheyer et al. | |
| 2013/0111348 | A1 | 5/2013 | Gruber et al. | |
| 2013/0111487 | A1 | 5/2013 | Cheyer et al. | |
| 2013/0117022 | A1 | 5/2013 | Chen et al. | |
| 2013/0185074 | A1 | 7/2013 | Gruber et al. | |
| 2013/0185081 | A1 | 7/2013 | Cheyer et al. | |
| 2014/0236570 | A1* | 8/2014 | Heck | G06F 16/3329 |
| | | | | 704/9 |
| 2016/0019293 | A1* | 1/2016 | Bhagwat | G06F 16/24578 |
| | | | | 707/732 |
| 2016/0379106 | A1* | 12/2016 | Qi | G06F 16/90332 |
| | | | | 706/11 |
| 2017/0178626 | A1 | 6/2017 | Gruber et al. | |
| 2018/0075335 | A1* | 3/2018 | Braz | G06F 16/24522 |
| 2020/0279556 | A1 | 9/2020 | Gruber et al. | |
| 2021/0119956 | A1 | 4/2021 | Morris et al. | |
| 2022/0254338 | A1 | 8/2022 | Gruber et al. | |
| 2023/0290347 | A1* | 9/2023 | Huang | G06F 40/279 |

FOREIGN PATENT DOCUMENTS

| | | |
|---|---|---|
| CN | 112382290 A | 2/2021 |
| JP | 2001195423 A | 7/2001 |
| JP | 2008090545 A | 4/2008 |
| JP | 2014191030 A | 10/2014 |
| WO | 2019138477 A1 | 7/2019 |
| WO | WO-2021196981 A1 * 10/2021 | G06F 16/332 |

OTHER PUBLICATIONS

Extended European Search Report of European Patent Application No. 21823167.8 dated Oct. 13, 2022, 10 pages.

* cited by examiner

VOICE INTERACTION METHOD AND APPARATUS, DEVICE AND COMPUTER STORAGE MEDIUM

This application is the national phase of PCT Application No. PCT/CN2021/097972 filed on Jun. 2, 2021, which claims priority to Chinese Patent Application No. 2020113075868, filed on Nov. 20, 2020, entitled "Voice Interaction Method and Apparatus, Device and Computer Storage Medium", which are hereby incorporated in their entireties by reference herein.

TECHNICAL FIELD

The present application relates to the field of computer application technologies, and particularly to the fields of artificial intelligence technologies and voice technologies.

BACKGROUND

This section is intended to provide a background or context for implementations of the present disclosure which are recited in the claims. The description herein is not admitted to be the prior art by inclusion in this section.

With a continuous development of a voice interaction technology, a user may perform a voice interaction with terminal devices, such as a smart sound box, a smart phone, or the like. In addition to a voice assistant of an operating system of the terminal device, more and more applications are equipped with the voice interaction technology. The user may obtain a corresponding service by inputting a voice instruction, thereby freeing both hands to a great extent.

SUMMARY

According to a first aspect, there is provided a voice interaction method, including:
performing voice recognition and demand analysis on a voice instruction input by a user;
in response to an unknown demand obtained by the demand analysis, acquiring information of a query entity and query content using a result of the demand analysis, and acquiring reply information corresponding to the query content by communication with the query entity; and
returning a first voice response to the user using the reply information.

According to a second aspect, there is provided an electronic device, including:
at least one processor; and
a memory connected with the at least one processor communicatively;
where the memory stores instructions executable by the at least one processor to enable the at least one processor to perform the above-mentioned method.

According to a third aspect, there is provided a non-transitory computer readable storage medium including computer instructions, which, when executed by a computer, cause the computer to perform the above-mentioned method.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the technical solutions and do not constitute a limitation of the present application. In the drawings.

DETAILED DESCRIPTION OF EMBODIMENTS

The following part will illustrate exemplary embodiments of the present application with reference to the drawings, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and conciseness, the descriptions of the known functions and structures are omitted in the descriptions below.

In an existing voice interaction scenario, since user demands are unable to be enumerated completely in advance, after voice recognition and demand understanding are performed on the voice instruction input by the user, the voice assistant is often unable to meet a new demand of the user, and only able to return to the user a response, such as "Sorry, I don't know this information". This response mode brings poor experiences to the user and is unable to meet the demands of the user.

Figure 1:
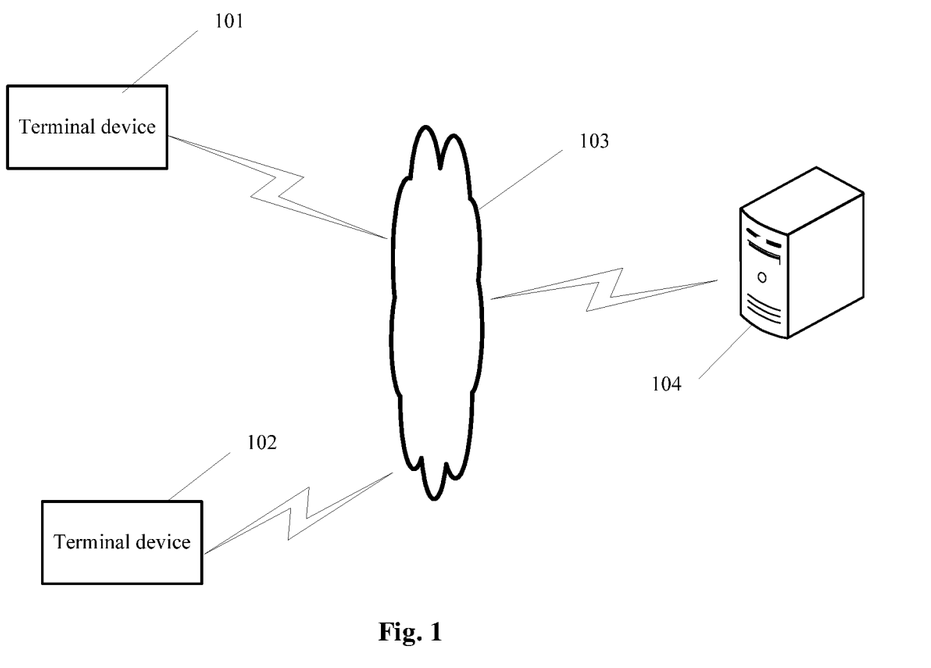
FIG. 1 shows an exemplary system architecture to which an embodiment of the present disclosure may be applied.

FIG. 1 shows an exemplary system architecture to which the embodiment of the present disclosure may be applied. As shown in FIG. 1, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a voice interaction application, a web browser application, a communication application, or the like, may be installed on the terminal devices 101, 102.

The terminal devices 101, 102 may be configured as various electronic devices supporting voice interaction, and may be configured as screen devices or non-screen devices, including, but not limited to, smart phones, tablets, intelligent loudspeaker boxes, smart televisions, or the like. A voice interaction apparatus according to the present disclosure may be provided and run in the above-mentioned server 104, or a computer terminal with high processing power. The apparatus may be implemented as a plurality of pieces of software or software modules (for example, for providing distributed service), or a single piece of software or software module, which is not limited specifically herein.

For example, the voice interaction apparatus is provided and run in the above-mentioned server 104, and the terminal device 101 transmits a voice instruction input by the user to the server 104 through the network 103. After performing a processing operation using a method according to an embodiment of the present disclosure, the server 104 returns a processing result (i.e., a voice response in the embodiment of the present application) to the terminal device 101, and then, the terminal device 101 provides the user with the processing result, thereby implementing a voice interaction with the user. The apparatus may take a form of a product, such as a voice assistant.

The server 104 may be configured as a single server or a server group including a plurality of servers. It should be understood that the numbers of the terminal devices, the network, and the server in FIG. 1 are merely schematic. There may be any number of terminal devices, networks and servers as desired for an implementation.

First Embodiment

Figure 2:
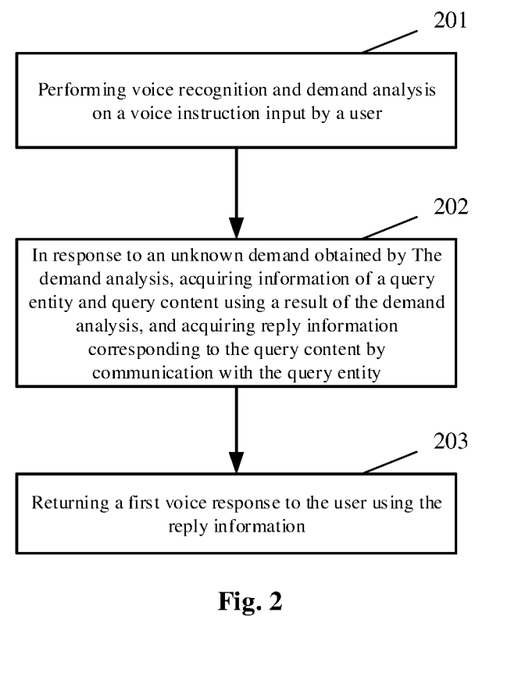
FIG. 2 is a flow chart of a main method according to a first embodiment of the present application.

FIG. 2 is a flow chart of a main method according to the first embodiment of the present application, and as shown in FIG. 2, the method may include the following steps:

201: performing voice recognition and demand analysis on a voice instruction input by a user.

The voice recognition is first performed on the voice instruction input by the user. After acquisition of a text obtained by the voice recognition, the demand analysis is performed. The demand analysis has a purpose of learning a specific demand (also referred to as an intention) of the user, so as to provide an accurate service for the user. Semantic understanding in a natural language processing technology is used in the demand analysis, and an existing mature implementation may be used in the semantic understanding, which is not detailed here.

202: in response to an unknown demand obtained by the demand analysis, acquiring information of a query entity and query content using a result of the demand analysis, and acquiring reply information corresponding to the query content by communication with the query entity.

If a known demand is obtained by the demand analysis, a response mode or a voice response corresponding to the known demand is usually stored and directly utilized for a response or a voice response, which is not described in detail.

If the unknown demand (i.e., a new demand) is obtained by the demand analysis, a processing operation is performed using the method according to the embodiment of the present application.

The above-mentioned query entity refers to an entity object corresponding to information to be acquired by the user in the result of the demand analysis, and the query content refers to information content to be acquired by the user in the result of the demand analysis. Details will be described in the following embodiments.

203: returning a first voice response to the user using the reply information.

From this embodiment, in the present application, under the condition that the new demand of the user is obtained by the demand analysis, instead of simply replying to the user with a voice response that the new demand is unable to be met, the response information corresponding to the query content is acquired by communication with the query entity, and the voice response is returned to the user utilizing the response information, which may compensate for an original blind area of a voice assistant in terms of demand satisfaction, meet the new demand of the user as far as possible, and improve user experiences.

Here, it should be noted that, in the present application, the terms "first", "second", "third", or the like, involved in the voice response (for example, "first voice response", "second voice response", and "third voice response") have no limitation in terms of an order, a number, and a name, but are only used to distinguish different voice responses.

Second Embodiment

Figure 3:
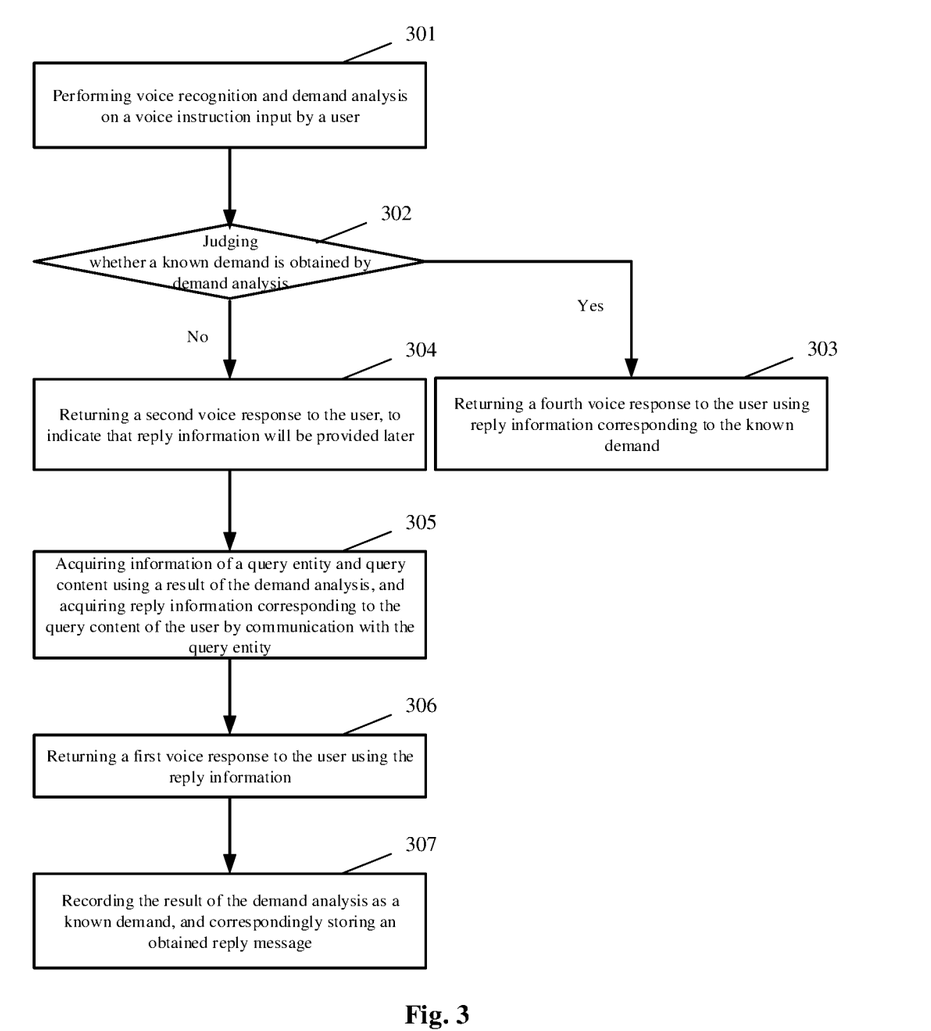
FIG. 3 is a flow chart of an implementable method according to a second embodiment of the present application.

FIG. 3 is a flow chart of an implementable method according to the second embodiment of the present application, and as shown in FIG. 3, the method may include the following steps:

301: performing voice recognition and demand analysis on a voice instruction input by a user.

302: judging whether a known demand is obtained by the demand analysis, if yes, executing 303; otherwise, executing 304.

303: returning a fourth voice response to the user using reply information corresponding to the known demand, and ending the flow.

Usually, corresponding reply information is already stored for the known demand, such that the fourth voice response may be returned after processing operations, such as voice synthesis directly using the reply information, a splicing operation using an existing voice fragment, or the like.

304: returning a second voice response to the user, to indicate that reply information will be provided later.

For an unknown demand (i.e., a new demand), preset voice responses may be first returned to the user, such as "I take it down, immediately ask for a latest message, expect to reply in 5 minutes", "I have received it, inquire about a message now, reply later", or the like, such that the user makes sure that the voice assistant tries to get a reply and will reply later, thus improving user experiences.

305: acquiring information of a query entity and query content using a result of the demand analysis, and acquiring reply information corresponding to the query content of the user by communication with the query entity.

Here, it should be noted that the voice instruction in the method according to the present application is mainly a query-type voice instruction; that is, the user wishes to obtain some information by a query using the voice instruction, for example, "May the Anning village railway ticket agency provide a service of printing a railway ticket reimbursement voucher", "May the Quanjude Roast Duck Restaurant provide a take-out service now", "Does the Hualian supermarket have an electric fan to be sold", or the like.

Core information of the new demand obtained after the demand analysis may be extracted. The core information at least includes the information of the query entity and the query content. An extraction method may be implemented based on semantic understanding and is not described in detail here.

For example, for the new demand "May the Anning village railway ticket agency provide a service of printing a railway ticket reimbursement voucher", the query entity extracted therefrom is "the Anning village railway ticket agency", and the query content is "provide a service of printing a railway ticket reimbursement voucher". Further, the information of the query entity, such as information of communication mode, location, or the like, may be obtained from a domain knowledge base. For example, a telephone number of the "Anning village railway ticket agency" may be inquired from a map knowledge base.

At least one round of interaction is performed with the query entity according to a communication mode corresponding to the information of the query entity, so as to send the query content to the query entity and acquire reply information returned by the query entity. Continuing with the above example, a telephone call may be made to the "Anning village railway ticket agency" by means of the voice assistant to perform the following interaction:

"Voice assistant: Hello, this is customer service ** (a brand name of the voice assistant), is that the Anning village railway ticket agency?
Anning village railway ticket agency: Yes.
Voice assistant: Could you provide a service of printing a railway ticket reimbursement voucher?
Anning village railway ticket agency: No.
Voice assistant: Thanks for your coordination, bye."

Query speech of the voice assistant in the above interaction may be generated based on a preset template in conjunction with the query content and the information of the query entity. The reply content obtained by the above interaction is "No".

Besides the telephone interaction, the interaction may be performed using other communication modes if the communication modes of the query entity are acquired, such as a WeChat interaction, a mail interaction, a dedicated instant messaging application, or the like.

306: returning a first voice response to the user using the reply information.

In this step, a first response text may be generated based on the preset template using the above-mentioned reply information, and voice synthesis or a voice splicing operation is performed using the first response text to obtain the first voice response.

Continuing with the above example, assuming that the template is "after [communication mode] confirmation, [query entity] [reply content] [query content]", "after telephone confirmation, the Anning village railway ticket agency may not provide a service of printing a railway ticket reimbursement voucher" may be returned to the user.

307: recording the result of the demand analysis as a known demand, and correspondingly storing an obtained reply message.

After the recording operation, if another user makes the known demand, the voice response may be generated using the corresponding reply message, and returned to the user, thus improving a response efficiency.

As an implementation, an aging time may be set for the known demand and the first voice response corresponding thereto, so as to ensure timeliness and effectiveness of the information. After the aging time is reached, the known demand and the first voice response corresponding thereto are deleted, and required to be obtained by querying the query entity again.

Third Embodiment

Figure 4:
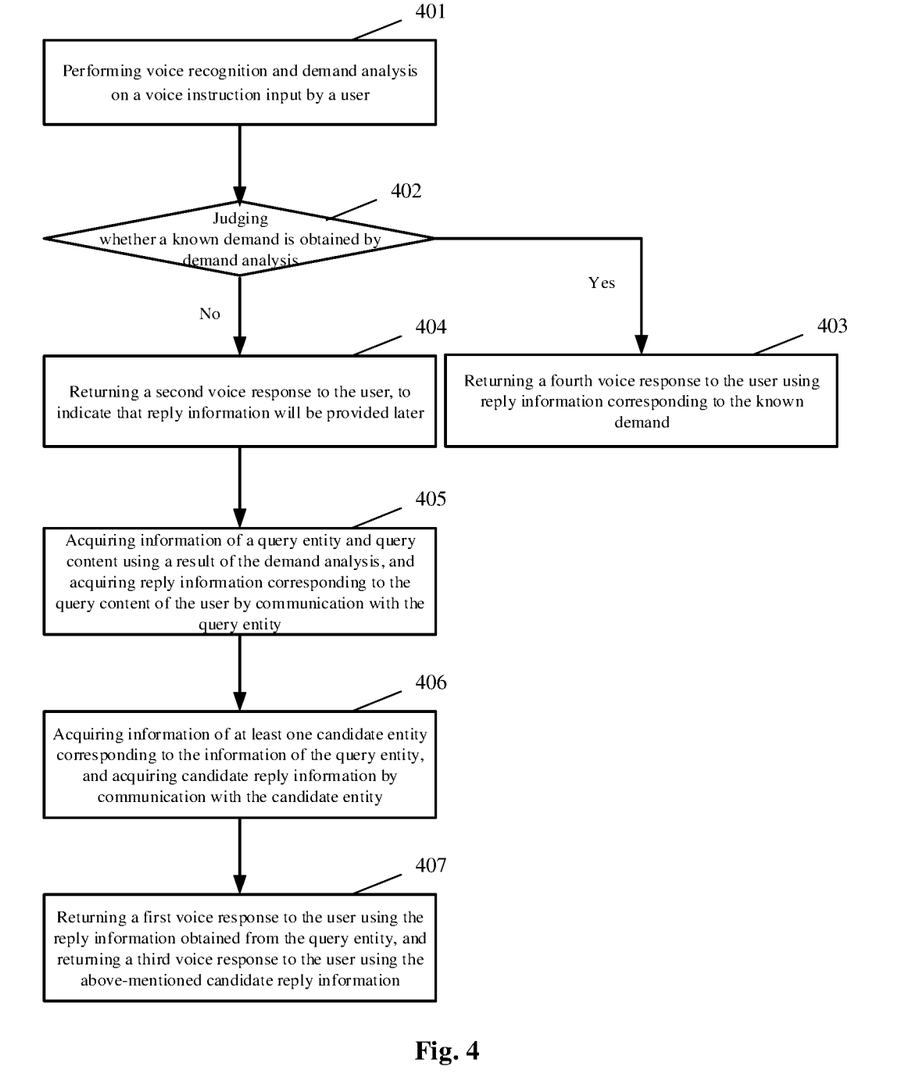
FIG. 4 is a flow chart of an implementable method according to a third embodiment of the present application.

FIG. 4 is a flow chart of an implementable method according to the third embodiment of the present application, and as shown in FIG. 4, the method may include the following steps:

Steps 401 to 405 are same as the steps 301 to 305 in the above-mentioned second embodiment.

406: acquiring information of at least one candidate entity corresponding to information of the query entity, and acquiring candidate reply information by communication with the candidate entity.

This step is intended to ensure that the reply information is more flexibly and comprehensively obtained, so as to meet the demands of the user as far as possible. In this embodiment, in addition to acquiring the information of the query entity, the information of candidate entity corresponding to the information of query entity is acquired to attempt to acquire the candidate reply information from the candidate entity.

As an implementation, during the acquisition of the information of the candidate entity corresponding to the information of the query entity, entities of the same type as the query entity may be obtained from the domain knowledge base; then, based on the correlation between the obtained entities and the query entity, at least one of the obtained entities is selected as the candidate entity, and the information of the candidate entity is obtained.

For the new demand "May the Anning village railway ticket agency provide a service of printing a railway ticket reimbursement voucher", after the extraction of the query entity "Arming village railway ticket agency" and the query content "provide a service of printing a railway ticket reimbursement voucher", entities in a same domain as the "Arming village railway ticket agency" may be obtained from a map-domain knowledge base, such as "Capital Gymnasium south road railway ticket agency", "Qinghe railway station", "Building-Material-City west road railway ticket agency", or the like. In the map domain, the correlation between entities of the same type is mostly reflected by a spatial distance, such that the spatial distance between each obtained entity and the query entity may be calculated, at least one entity may be selected from the obtained entities as the candidate entity according to an ascending order of the spatial distances, and the information of the candidate entity is obtained. For example, the "Qinghe railway station" is closest to the "Arming village railway ticket agency", and therefore, the "Qinghe railway station" may be taken as the candidate entity, and the telephone number of the "Qinghe railway station" may be obtained from the map-domain knowledge base. Then, whether the Qinghe railway station provides a service of printing a railway ticket reimbursement voucher is inquired over the telephone, and an acquired reply message is taken as a candidate reply message.

407: returning a first voice response to the user using the reply information obtained from the query entity, and returning a third voice response to the user using the above-mentioned candidate reply information.

Similarly to the first voice response, the third voice response may also be generated using a preset template in conjunction with the candidate reply information. The generated first and third voice responses may be played one by one or after being spliced.

Continuing with the above example, assuming that the obtained candidate reply message is yes after whether the Qinghe railway station provides a service of printing a railway ticket reimbursement voucher is inquired over the telephone, the first and second voice responses returned to the user are "after telephone confirmation, the Anning village railway ticket agency may not provide a service of printing a railway ticket reimbursement voucher, but the Qinghe railway station closer to you may provide a service of printing a railway ticket reimbursement voucher".

From this embodiment, by expanding to the candidate entity and by the acquisition of the candidate reply information from the candidate entity, the voice response returned to the user may be more flexible and comprehensive, and the demands of the user may be met as far as possible.

Fourth Embodiment

Figure 5:
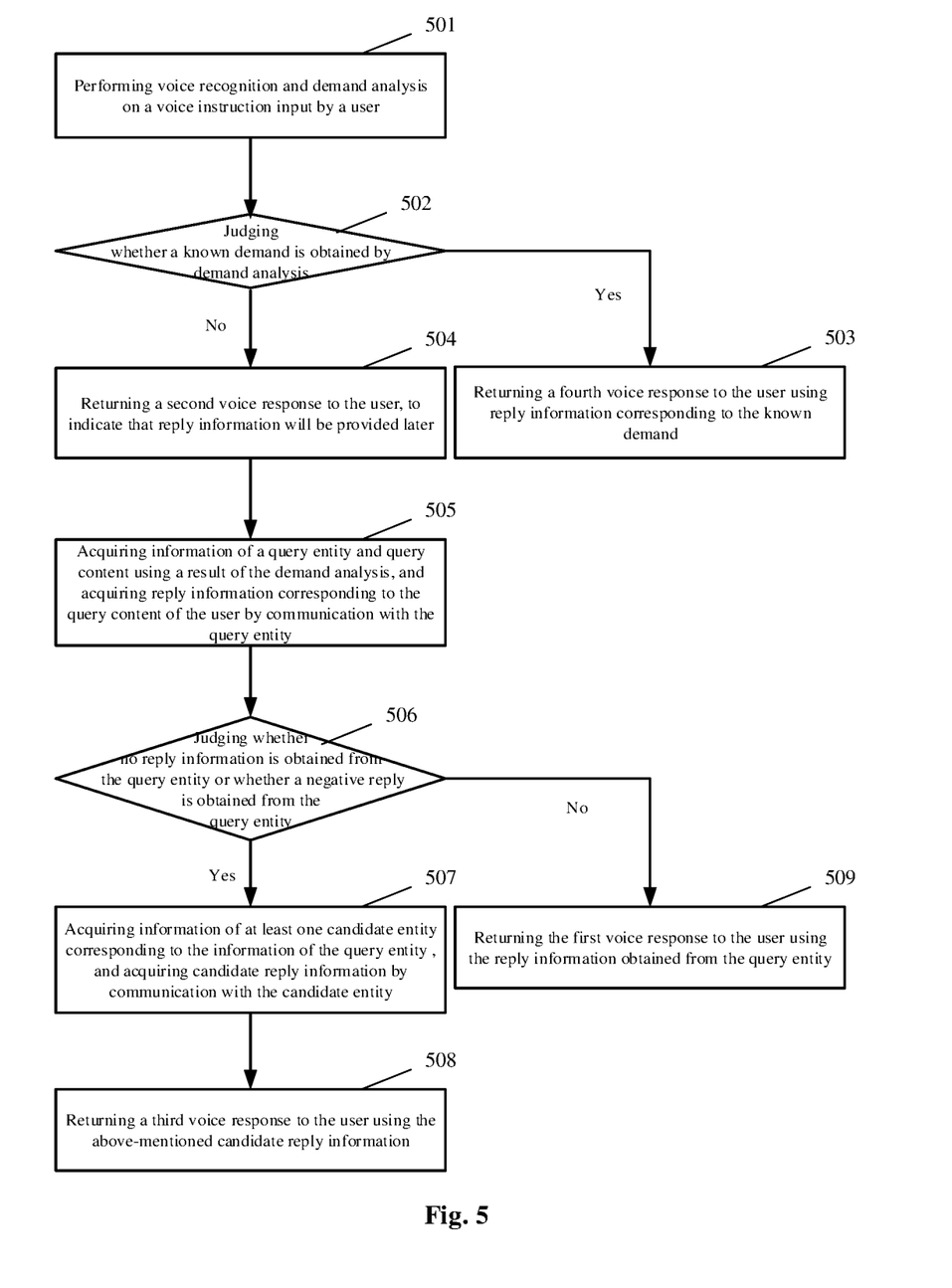
FIG. 5 is a flow chart of an implementable method according to a fourth embodiment of the present application.

FIG. 5 is a flow chart of an implementable method according to the fourth embodiment of the present application, and as shown in FIG. 5, the method may include the following steps:

Steps 501 to 505 are same as the steps 301 to 305 in the above-mentioned second embodiment.

506: judging whether no reply information is obtained from the query entity or whether a negative reply is obtained from the query entity, if yes, executing 507; otherwise, executing 509.

The communication with the query entity may be not established successfully, or the reply information corresponding to the query content may be not obtained in the process of communication with the query entity, and in this case, the negative reply may be obtained from the query entity; for example, after the process of inquiring whether the Anning village railway ticket agency provide a service of printing a railway ticket reimbursement voucher, the obtained reply is no. In such a case, the actual demand of the user (i.e., a demand of finding a place providing a service of printing a railway ticket reimbursement voucher) may not be well met. Therefore, subsequent steps 507 and 508 may be adopted to further obtain the candidate reply information from the candidate entity.

However, if a positive reply is obtained from the query entity, the actual demand of the user is possibly met, and therefore, the first voice response may be returned to the user directly using the reply information obtained from the query entity.

507: acquiring information of at least one candidate entity corresponding to the information of the query entity, and acquiring candidate reply information by communication with the candidate entity.

508: returning a first voice response to the user using the reply information obtained from the query entity, and returning a third voice response to the user using the above-mentioned candidate reply information.

The above-mentioned steps 507 and 508 are same as the steps 406 and 407 in the third embodiment, and are not repeated herein.

509: returning the first voice response to the user using the reply information obtained from the query entity.

In addition, in the above-mentioned third and fourth embodiments, if the reply information and the candidate reply information described above are not acquired within preset duration, a preset fourth voice response is returned to the user. In some special cases, no reply information may be obtained from both the query entity and the candidate entity, and then, in order to avoid that an overlong waiting time of the user affects the user experiences, a timing operation may be started after the second voice response is returned to the user. If the reply information and the candidate reply information described above are not acquired after the preset duration is reached, a preset voice response, such as "Sorry, no information about whether the Anning village railway ticket agency provides a service of printing a reimbursement voucher is obtained, please try to acquire the information in other ways", or the like, may be returned to the user.

In the above-mentioned third and fourth embodiments, the result of the demand analysis may be recorded as a known demand, and the obtained reply message (including the reply message obtained from the query entity and the candidate reply message obtained from the candidate entity) may be stored correspondingly. As an implementation, when the reply message is stored, a structured reply message organization form may be adopted. For example:

Entity Anning village railway ticket agency
    Query content: Provide a service of printing a railway ticket reimbursement voucher
    Query result: No
    Entity: Qinghe railway station
    Query content: Provide a service of printing a railway ticket reimbursement voucher
    Query result: No The methods according to the present application are described above in detail, and apparatuses according to the present application will be described below in detail in conjunction with embodiments.

Fifth Embodiment

Figure 6:
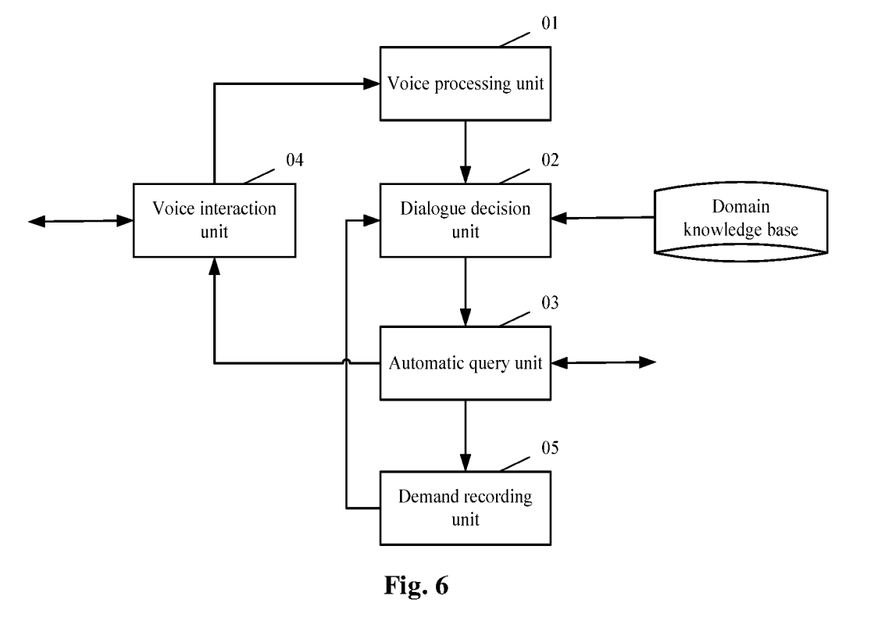
FIG. 6 is a structural diagram of a voice interaction apparatus according to a fifth embodiment of the present application.

FIG. 6 is a structural diagram of the voice interaction apparatus according to the fifth embodiment of the present application; the apparatus may be configured as an application located at a server, or a functional unit, such as a plug-in or software development kit (SDK) located in the application of the server, or the like, or be located at a computer terminal with high computing power, which is not particularly limited in the embodiment of the present disclosure. As shown in FIG. 6, the apparatus may include a voice processing unit 01, a dialogue decision unit 02, an automatic query unit 03 and a voice interaction unit 04, and may further include a demand recording unit 05. The main functions of each constitutional unit are as follows.

After the voice interaction unit 04 receives a voice instruction input by a user, the voice processing unit 01 is configured to perform voice recognition and demand analysis on the voice instruction input by the user.

If the voice processing unit 01 obtains an unknown demand by the demand analysis, the dialogue decision unit 02 acquires information of a query entity and query content using a result of the demand analysis.

Core information of the unknown demand (i.e., a new demand) obtained after the demand analysis may be extracted. The core information at least includes the information of a query entity and the query content. An extraction method may be implemented based on semantic understanding. Further, the information of query entity, such as information of communication mode, location, or the like, may be obtained from a domain knowledge base.

The automatic query unit 03 is configured to acquire reply information corresponding to the query content by communication with the query entity.

Specifically, the automatic query unit 03 may perform at least one round of interaction with the query entity according to a communication mode corresponding to the information of the query entity, so as to send the query content to the query entity and acquire reply information returned by the query entity.

The voice interaction unit 04 is configured to return a first voice response to the user using the reply information.

As one implementation, a first response text may be generated based on a preset template using the above-mentioned reply information, and voice synthesis or a voice splicing operation is performed using the first response text to obtain the first voice response.

Further, the voice interaction unit 04 is further configured to, after the voice processing unit 04 obtains the unknown demand by the demand analysis and before the first voice response is returned to the user, return a second voice response to the user to indicate that the reply information will be provided later.

The demand recording unit 05 is configured to record the result of the demand analysis as a known demand and correspondingly store the reply information.

If the voice processing unit 01 obtains the known demand by the demand analysis, the voice interaction unit 04 directly returns a voice response to the user using the reply information corresponding to the known demand.

As an implementation, the dialogue decision unit 02 is further configured to acquire information of at least one candidate entity corresponding to the information of the query entity.

Specifically, the dialogue decision unit 02 may obtain entities of a same type as the query entity from a domain knowledge base to which the query entity belongs; based on the correlation between the obtained entities and the query entity, select at least one of the obtained entities as the candidate entity, and obtain the information of the candidate entity.

The automatic query unit 03 is further configured to acquire candidate reply information by communication with the candidate entity.

As an implementation, if no reply information corresponding to the query content is acquired by the communication with the query entity, or if negative reply information is acquired by the communication with the query entity, the automatic query unit 03 may acquire the candidate reply information by communication with the candidate entity.

The voice interaction unit 04 is further configured to return a third voice response to the user using the information of the candidate entity and the candidate reply information.

Similarly to the first voice response, the third voice response may also be generated using a preset template in conjunction with the candidate reply information. The generated first and third voice responses may be played one by one or after being spliced.

As an implementation, the voice interaction unit 04 is further configured to, if the automatic query unit 03 does not acquire the reply information and the candidate reply information within preset duration, return a preset fourth voice response to the user.

According to the embodiment of the present application, there are also provided an electronic device and a readable storage medium.

Figure 7:
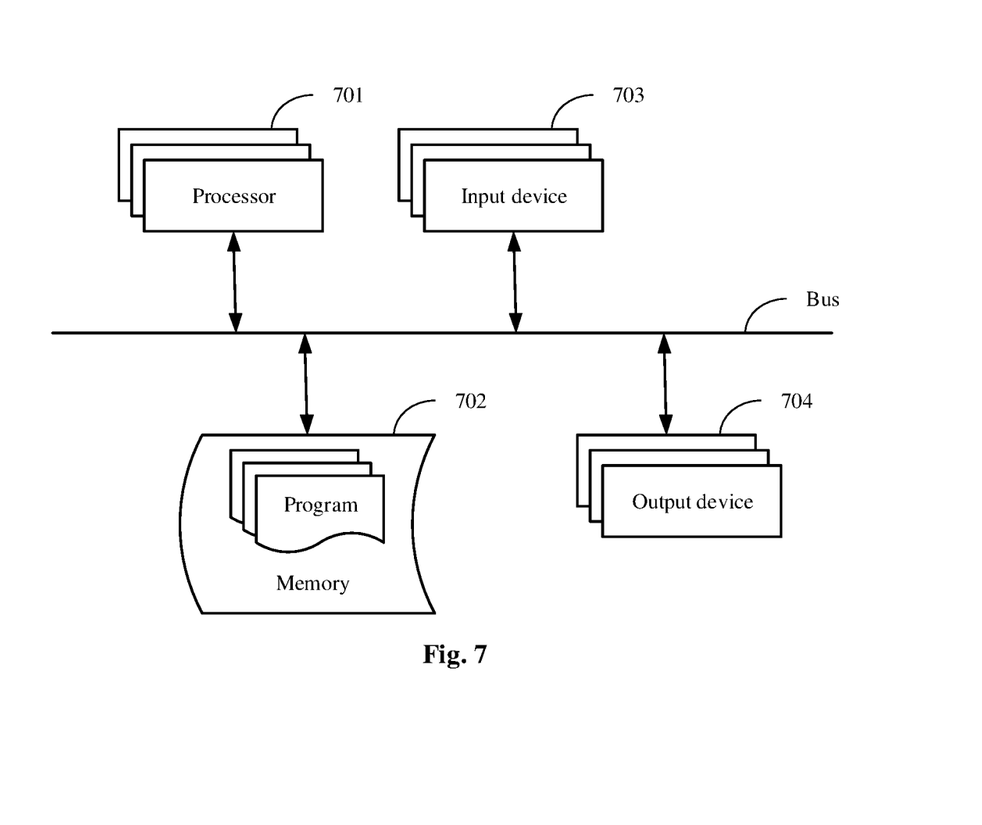
FIG. 7 is a block diagram of an electronic device configured to implement embodiments of the present application.

FIG. 7 is a block diagram of an electronic device for the voice interaction method according to the embodiment of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital processors, cellular telephones, smart phones, wearable devices, and other similar computing devices. The components shown herein, their connections and relationships, and their functions, are meant to be exemplary only, and are not meant to limit implementation of the present application described and/or claimed herein.

As shown in FIG. 7, the electronic device includes one or more processors 701, a memory 702, and interfaces configured to connect the components, including high-speed interfaces and low-speed interfaces. The components are interconnected using different buses and may be mounted at a common motherboard or in other manners as desired. The processor may process instructions for execution within the electronic device, including instructions stored in or at the memory to display graphical information for a GUI at an external input/output devices, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 7, one processor 701 is taken as an example.

The memory 702 is configured as the non-transitory computer readable storage medium according to the present application. The memory stores instructions executable by the at least one processor to cause the at least one processor to perform the voice interaction method according to the present application. The non-transitory computer readable storage medium according to the present application stores computer instructions for causing a computer to perform the voice interaction method according to the present application.

The memory 702 which is a non-transitory computer readable storage medium may be configured to store non-transitory software programs, non-transitory computer executable programs and modules, such as program instructions/modules corresponding to the voice interaction method according to the embodiment of the present application. The processor 701 executes various functional applications and data processing of a server, that is, implements the voice interaction method according to the above-mentioned embodiment, by running the non-transitory software programs, instructions, and modules stored in the memory 702.

The memory 702 may include a program storage area and a data storage area, where the program storage area may store an operating system and an application program required for at least one function; the data storage area may store data created according to use of the electronic device, or the like. Furthermore, the memory 702 may include a high-speed random access memory, or a non-transitory memory, such as at least one magnetic disk storage device, a flash memory device, or other non-transitory solid state storage devices. In some embodiments, optionally, the memory 702 may include memories remote from the processor 701, and such remote memories may be connected to the electronic device via a network. Examples of such a network include, but are not limited to, the Internet, intranets, local area networks, mobile communication networks, and combinations thereof.

The electronic device for the voice interaction method may further include an input device 703 and an output device 704. The processor 701, the memory 702, the input device 703 and the output device 704 may be connected by a bus or other means, and FIG. 7 takes the connection by a bus as an example.

The input device 703 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output device 704 may include a display device, an auxiliary lighting device (for example, an LED) and a tactile feedback device (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, application specific integrated circuits (ASIC), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLD)) for providing machine instructions and/or data for a programmable processor, including a machine readable medium which receives machine instructions as a machine readable signal. The term "machine readable signal" refers to any signal for providing machine instructions and/or data for a programmable processor.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other.

It should be understood that various forms of the flows shown above may be used and reordered, and steps may be added or deleted. For example, the steps described in the present application may be executed in parallel, sequentially, or in different orders, which is not limited herein as long as the desired results of the technical solution disclosed in the present application may be achieved.

The above-mentioned implementations are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

The invention claimed is:

1. A voice interaction method, comprising:
performing voice recognition and demand analysis on a voice instruction input by a user;
in response to an unknown demand obtained by the demand analysis, acquiring information of a query entity, which is an entity object corresponding to information to be acquired by the user, and query content from a result of the demand analysis, acquiring communication mode of the query entity, sending the query content to the query entity in the communication mode and acquiring reply information corresponding to the query content returned by the query entity;
returning a first voice response to the user using the reply information,
acquiring information of at least one candidate entity corresponding to the information of the query entity;
acquiring candidate reply information by communication with the at least one candidate entity; and
returning a third voice response to the user using the information of the at least one candidate entity and the candidate reply information.

2. The method according to claim 1, further comprising: after obtaining the unknown demand by the demand analysis and before returning the first voice response to the user,
returning a second voice response to the user to indicate that the reply information will be provided later.

3. The method according to claim 1, further comprising: after acquiring the reply information corresponding to the query content,
recording the result of the demand analysis as a known demand and correspondingly storing the reply information.

4. The method according to claim 1, wherein acquiring the information of at least one candidate entity corresponding to the information of the query entity comprises:
obtaining entities of a same type as the query entity from a domain knowledge base to which the query entity belongs; and
based on a correlation between the obtained entities and the query entity, selecting at least one of the obtained entities as the at least one candidate entity, and obtaining the information of the candidate entity.

5. The method according to claim 1, wherein acquiring the candidate reply information by communication with the candidate entity comprises:
if no reply information corresponding to the query content is acquired by communication with the query entity, or if negative reply information is acquired by communication with the query entity, acquiring the candidate reply information by communication with the candidate entity.

6. The method according to claim 1, wherein acquiring the reply information corresponding to the query content by communication with the query entity comprises:
performing at least one round of interaction with the query entity according to a communication mode corresponding to the information of the query entity, so as to send the query content to the query entity and acquire the reply information returned by the query entity.

7. The method according to claim 1, further comprising:
if the reply information and the candidate reply information are not acquired within a preset duration, returning a preset fourth voice response to the user.

8. An electronic device, comprising:
at least one processor; and
a memory connected with the at least one processor communicatively;
wherein the memory stores instructions executable by the at least one processor to enable the at least one processor to perform a voice interaction method, which comprises:
performing voice recognition and demand analysis on a voice instruction input by a user;
in response to an unknown demand obtained by the demand analysis, acquiring information of a query entity, which is an entity object corresponding to information to be acquired by the user, and query content from a result of the demand analysis, acquiring communication mode of the query entity, sending the query content to the query entity in the communication mode and acquiring reply information corresponding to the query content returned by the query entity;
returning a first voice response to the user using the reply information;
acquiring information of at least one candidate entity corresponding to the information of the query entity;
acquiring candidate reply information by communication with the at least one candidate entity; and
returning a third voice response to the user using the information of the at least one candidate entity and the candidate reply information.

9. A non-transitory computer readable storage medium comprising computer instructions, which, when executed by a computer, cause the computer to perform a voice interaction method, which comprises:
performing voice recognition and demand analysis on a voice instruction input by a user;
in response to an unknown demand obtained by the demand analysis, acquiring information of a query entity, which is an entity object corresponding to information to be acquired by the user, and query content from a result of the demand analysis, acquiring communication mode of the query entity, sending the query content to the query entity in the communication mode and acquiring reply information corresponding to the query content returned by the query entity;
returning a first voice response to the user using the reply information;
acquiring information of at least one candidate entity corresponding to the information of the query entity;
acquiring candidate reply information by communication with the at least one candidate entity; and
returning a third voice response to the user using the information of the at least one candidate entity and the candidate reply information.

10. The electronic device according to claim 8, wherein the method further comprises: after obtaining the unknown demand by the demand analysis and before returning the first voice response to the user,
returning a second voice response to the user to indicate that the reply information will be provided later.

11. The electronic device according to claim 8, wherein the method further comprises: after acquiring the reply information corresponding to the query content,
recording the result of the demand analysis as a known demand and correspondingly storing the reply information.

12. The electronic device according to claim 8, wherein acquiring the information of at least one candidate entity corresponding to the information of the query entity comprises:
obtaining entities of a same type as the query entity from a domain knowledge base to which the query entity belongs; and
based on a correlation between the obtained entities and the query entity, selecting at least one of the obtained entities as the at least one candidate entity, and obtaining the information of the candidate entity.

13. The electronic device according to claim 8, wherein acquiring the candidate reply information by communication with the at least one candidate entity comprises:
if no reply information corresponding to the query content is acquired by communication with the query entity, or if negative reply information is acquired by communication with the query entity, acquiring the candidate reply information by communication with the at least one candidate entity.

14. The electronic device according to claim 8, wherein acquiring the reply information corresponding to the query content by communication with the query entity comprises:
performing at least one round of interaction with the query entity according to a communication mode corresponding to the information of the query entity, so as to send the query content to the query entity and acquire the reply information returned by the query entity.

15. The electronic device according to claim 8, wherein the method further comprising:
if the reply information and the candidate reply information are not acquired within a preset duration, returning a preset fourth voice response to the user.

16. The non-transitory computer readable storage medium according to claim 9, wherein the method further comprises: after obtaining the unknown demand by the demand analysis and before returning the first voice response to the user,
returning a second voice response to the user to indicate that the reply information will be provided later.

17. The non-transitory computer readable storage medium according to claim 9, wherein the method further comprises: after acquiring the reply information corresponding to the query content,
recording the result of the demand analysis as a known demand and correspondingly storing the reply information.

* * * * *